United States Patent
Anderson et al.

(10) Patent No.: US 9,528,643 B2
(45) Date of Patent: Dec. 27, 2016

(54) AIR GROMMET CONNECTOR

(71) Applicant: CNH Industrial Canada, Ltd., Saskatoon (CA)

(72) Inventors: Brian Anderson, Yorkville, IL (US); Chance Peutert, Assiniboia (CA); Chad Johnson, Arlington Heights, IL (US); Scott Long, Plainfield, IL (US); Rick Justice, South Bend, IN (US); Travis Harnetiaux, Bourbonnais, IL (US); Johnathon Dienst, DeKalb, IL (US); Patrick Dinnon, Plainfield, IL (US); Ryan Raetzman, Lemont, IL (US); Michael Connors, Lockport, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/557,943

(22) Filed: Dec. 2, 2014

(65) Prior Publication Data

US 2016/0153594 A1    Jun. 2, 2016

(51) Int. Cl.
F16L 41/08    (2006.01)
F16L 37/00    (2006.01)
A01G 25/00    (2006.01)

(52) U.S. Cl.
CPC ............. *F16L 37/008* (2013.01); *A01G 25/00* (2013.01); *F16L 41/08* (2013.01)

(58) Field of Classification Search
CPC ................................ F16L 41/088; F16L 41/08
USPC .................................................. 285/197, 201
See application file for complete search history.

(56) References Cited

U.S. PATENT DOCUMENTS

| | | | | | |
|---|---|---|---|---|---|
| 2,180,960 | A | * | 11/1939 | Kennedy | 285/192 |
| 2,784,865 | A | * | 3/1957 | Rieke | 285/201 |
| 3,275,030 | A | * | 9/1966 | Alvin | 137/565.11 |
| 3,490,791 | A | | 1/1970 | Mitchell | |
| 3,531,142 | A | | 9/1970 | Peasley | |
| 3,542,980 | A | * | 11/1970 | Hamilton | F16B 9/02 285/205 |

(Continued)

FOREIGN PATENT DOCUMENTS

| | | | |
|---|---|---|---|
| DE | 2340792 | * 2/1974 | |
| DE | 3719552 C1 | * 11/1988 | F16L 1/02 |

(Continued)

OTHER PUBLICATIONS www.pchemlabs.com/product.asp?pid=3447; Ideal Vacuum Products; Mar. 6, 2014; 2 pages.

(Continued)

*Primary Examiner* — David E Bochna
(74) *Attorney, Agent, or Firm* — Rebecca L. Henkel; Rickard K. DeMille

(57) ABSTRACT

A connector is provided for connecting a pneumatic hose having an end to a structural member of an agricultural implement. A tubular grommet extends through a port in the structural member. A flange extends radially from the outer surface from the tubular grommet and is engageable with a first side of the structural member. A locking barb also extends from the outer surface from the tubular grommet adjacent a second end thereof. The locking barb is engageable with a second side of the structural member with the second end of the tubular grommet received within the interior of structural member.

16 Claims, 7 Drawing Sheets

(56) References Cited

U.S. PATENT DOCUMENTS

| | | | | |
|---|---|---|---|---|
| 3,649,055 | A | * | 3/1972 | Nilsen .................... 285/197 |
| 3,806,031 | A | * | 4/1974 | Olson ..................... 285/197 |
| 3,892,169 | A | * | 7/1975 | Jarnot .................. B60H 1/26 285/200 |
| 3,973,732 | A | * | 8/1976 | Diggs ..................... 285/200 |
| 4,294,470 | A | * | 10/1981 | Tucker .................... 285/197 |
| 4,441,744 | A | * | 4/1984 | Oostenbrink et al. ........ 285/197 |
| 4,706,999 | A | * | 11/1987 | Hynes ..................... 285/197 |
| 4,903,999 | A | * | 2/1990 | Steudler, Jr. .............. 285/197 |
| 5,207,461 | A | * | 5/1993 | Lasko ..................... 285/197 |
| 5,361,542 | A | | 11/1994 | Dettloff |
| 5,507,536 | A | | 4/1996 | Oliveto, II et al. |
| 5,582,074 | A | * | 12/1996 | Kelley ................... F16C 1/103 74/502.4 |
| 5,826,855 | A | * | 10/1998 | Dick ..................... E04H 4/0018 137/315.27 |
| 6,082,782 | A | | 7/2000 | Bartholoma et al. |
| 6,406,068 | B1 | | 6/2002 | Bartholoma et al. |
| 6,460,896 | B1 | | 10/2002 | Stephens et al. |
| 6,725,788 | B2 | | 4/2004 | McCartney et al. |
| 6,843,510 | B2 | | 1/2005 | Leymarie et al. |
| 6,995,317 | B1 | | 2/2006 | Dzurilla |
| 7,017,502 | B2 | | 3/2006 | Quam et al. |
| 7,025,387 | B2 | | 4/2006 | Twardawski et al. |
| 7,128,346 | B2 | * | 10/2006 | Miyajima et al. ............ 285/204 |
| 7,240,700 | B2 | * | 7/2007 | Pangallo ................ B62D 25/24 296/208 |
| 7,384,073 | B1 | | 6/2008 | Tuyls et al. |
| 7,588,201 | B2 | | 9/2009 | Masarwa et al. |
| 7,862,090 | B1 | | 1/2011 | Foreman |
| 7,918,486 | B2 | | 4/2011 | Preisendorfer |
| 7,988,203 | B2 | * | 8/2011 | Martin .................... 285/201 |
| 8,262,094 | B2 | | 9/2012 | Beele |
| 8,490,928 | B2 | | 7/2013 | Saunders |
| 2002/0130515 | A1 | | 9/2002 | Miyajima et al. |
| 2006/0103132 | A1 | | 5/2006 | Hardin et al. |
| 2007/0108763 | A1 | | 5/2007 | Preisendorfer |
| 2008/0093843 | A1 | * | 4/2008 | Noroozi et al. .............. 285/81 |
| 2010/0253069 | A1 | | 10/2010 | Bartholoma et al. |
| 2010/0258658 | A1 | | 10/2010 | Christensen et al. |
| 2011/0272939 | A1 | | 11/2011 | Stettner et al. |
| 2013/0061424 | A1 | | 3/2013 | Lee |

FOREIGN PATENT DOCUMENTS

| | | | |
|---|---|---|---|
| DE | 29918122 | U1 * | 1/2000 |
| EP | 0935087 | | 4/2001 |
| EP | 1352193 | | 10/2005 |
| EP | 1065426 | | 12/2006 |
| EP | 1548349 | | 5/2011 |
| EP | 2589708 | | 5/2013 |
| GB | 1441837 | A * | 7/1976 |
| WO | 9421312 | A2 | 9/1994 |
| WO | 2014085867 | | 6/2014 |
| WO | 2014122051 | | 8/2014 |

OTHER PUBLICATIONS wwww.3mcollision.com/3m-vacuum-hose-adapter-28302.html; 3M; Mar. 6, 2014; 2 pages.

www.lowrangeoffroad.com/index.php/suzuki/samurai/brakes/suzuki-samurai-master-cylinder-reservoir-connector-grommet.html; Suzuki; Mar. 6, 2014; 4 pages.

www.alliance-express.com/grommet-sleeves; Essentra Components; Mar. 6, 2014; 2 pages.

www.horticulturesource.com/barbed-adapter-3-4-in-to-3-4-in-mipt-p4021?/osCsid=1d82640789d5aa8edfd80675f6321; Horticulture Source; Mar. 6, 2014; 4 pages.

* cited by examiner

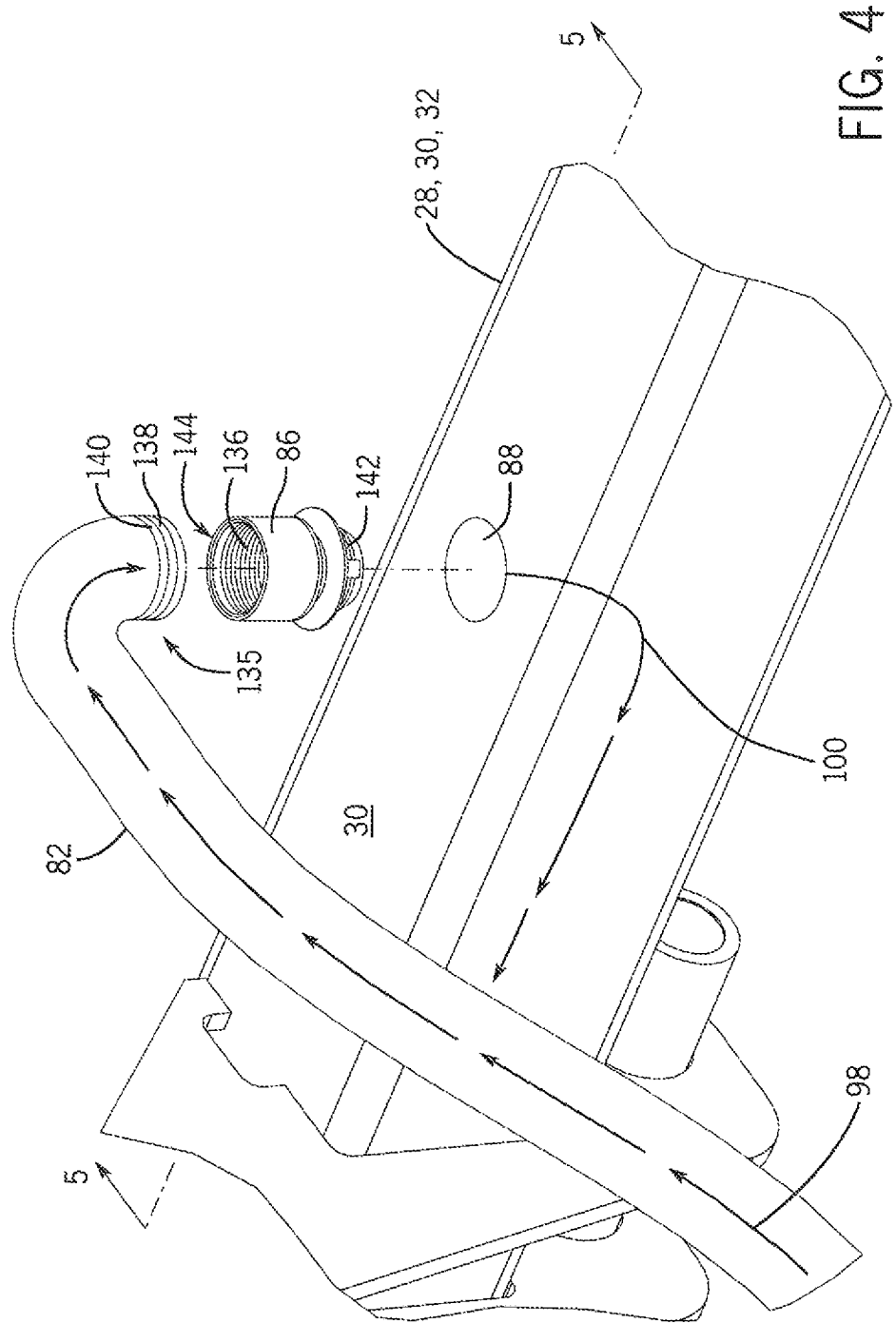

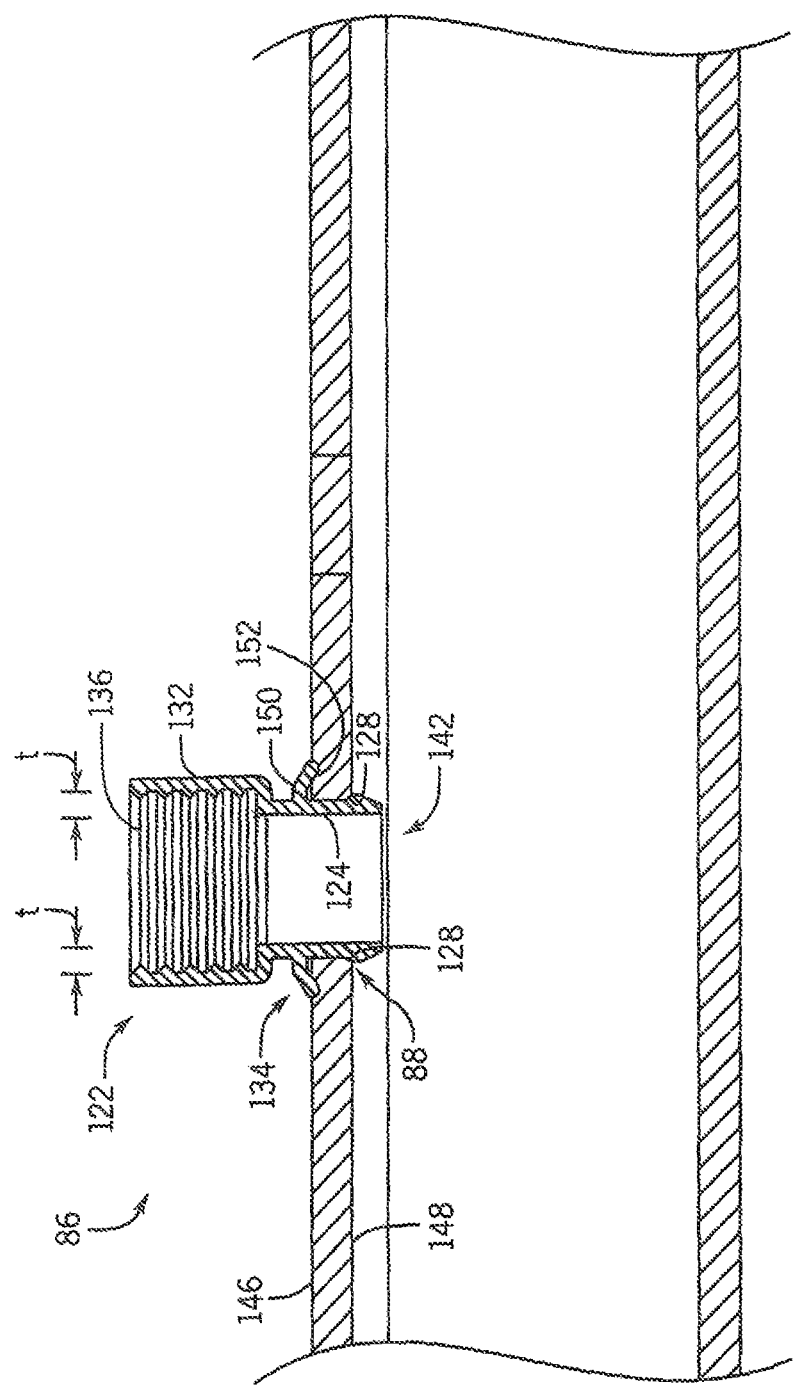

AIR GROMMET CONNECTOR

FIELD OF THE INVENTION

The invention relates generally to agricultural product application equipment such as agricultural planters and, in particular, to a connector for quickly connecting a tubular structure to a structural member of the planter and preventing unwanted detachment of the tubular structure.

BACKGROUND OF THE INVENTION

Conventional agricultural planters are often employed to deposit planting material into soil. Many planters include a material dispensing implement that is towed behind a tractor or similar vehicle for distributing planting material, such as seed, fertilizer, pesticide, and other chemicals and materials, onto a furrowed farmland or similar planting surface. The implement may consist of multiple dispensing units that are supported by a common or shared frame that is towed by the tractor. The dispensing units are commonly referred to as row units.

The common or shared frame may include one or more hollow members for providing structural support to the agricultural planter. The hollow member is typically a metal beam that is capable of bearing and distributing static and dynamic loads of the planter. The hollow member typically has at least two ports, one attached to an individual row unit and one attached to a fan. The ports allow communication between the individual row unit and fan via a conduit or tube attached to the ports of the hollow member on a first end and to the row unit and fan on the second end. The interior of the hollow member provides a path for forced airflow between the individual row unit and the fan to enable pneumatic operation of a feature of the agricultural planter, such as a seed meter.

In agricultural planters, a seed meter regulates the rate of seed distribution in each row unit, Typically, the seed meter is pneumatically operated by a fan. The fan provides airflow to drive each individual seed meter through a complex network of conduits separate from the common or shared frame. For example, a separate conduit may connect each seed meter directly with a port of the fan. An orifice may be disposed in the port(s) to restrict the airflow through the port and to the seed meter. Additionally, each row unit may include a pneumatic seed meter that controls the seed flow rate and/or the spacing of seeds deposited in the ground. More specifically, the seed meters may utilize a vacuum pressure to attach seeds to a seed disc, which is used to control the output of seeds from the seed meter, Thus, a vacuum pressure source may be pneumatically coupled to each seed meter. Accordingly, assembling a planting implement may include attaching each row unit to the planting implement frame and routing vacuum lines to each seed meter, as well as additional assembly steps.

The operation of agricultural planters relies upon the connection of a number of conduits for allowing airflow between the row units and the fan. This connection between conduits must be sealed, as pneumatic communication depends on uninterrupted airflow between structures. Typically, a conduit is attached to a structure by welding a round pipe to a port, attaching an elbow to the pipe, and attaching a vacuum hose to the elbow. All of the connections generally rely on a friction seal.

Therefore, it is desired to provide a connector which allows a user to quickly connect a vacuum hose to a vacuum structure without gaskets or welding.

SUMMARY OF THE INVENTION

Therefore, it is a primary object and feature of the present invention to provide a connector for quickly connecting a tubular structure to a structural member for air flow communication therewith.

It is a further object and feature of the present invention to provide a connector for quickly connecting a tubular structure to a structural member which may be utilized with preexisting ports in the structural member.

It is a further object and feature of the present invention to provide a connector for quickly connecting a tubular structure to a structural member which does not require welding or gaskets.

It is a still further object and feature of the invention to provide a connector for quickly connecting a tubular structure to a structural member which is simple to use and inexpensive to manufacture.

In accordance with the present invention, a connector is provided for connecting a tubular structure to a structural member having a port therethrough, The tubular structure includes a terminal end. The connector has a tubular head defining a passage extending along an axis. The tubular head is connectable to the terminal end of the tubular structure. A tubular neck extends from the tubular head. The tubular neck has a passage in communication with the passage of the tubular head and extends along the axis. The tubular neck also includes a first portion configured to pass through the port and into the structural member. A flange extends from a second portion of the tubular neck. The flange is configured to engage a first side of the structural member. A locking barb extends from the first portion of the tubular neck and is engageable with a second side of the structural member. The locking barb discourages removal of the first portion of the tubular neck from the structural member through the port.

The flange extends radially from the second portion of the tubular neck and has a terminal end that is engageable with the first side of the structural member. The flange includes a sealing surface. The sealing surface is engageable with the first side of the structural member and provides an air tight seal about the port. The tubular neck includes an inner surface and a terminal end. The locking barb includes a projection surface extending from the terminal end of the tubular neck and diverging from the inner surface of the tubular neck. The projection surface includes a terminal end spaced from the terminal end of the tubular neck. The terminal end of the projection surface is interconnected to the tubular neck by a ledge. It is contemplated for the flange to be resilient so as to urge the ledge toward the second side of the structural housing with the first portion of the tubular neck received in the structural member. The locking barb may be a first locking barb of a plurality of locking barbs circumferentially spaced about the first portion of the tubular neck.

The passage through the tubular head has a diameter greater than a diameter of the passage through the tubular neck. The passage through the tubular head is defined by an inner surface. The inner surface of the tubular neck is threaded and adapted to receive corresponding threads on the tubular structure in a mating relationship. The tubular neck has an outer diameter. The outer diameter of the tubular neck is at least equal to a diameter of the port.

In accordance with a further aspect of the present invention, a connector is provided for connecting a pneumatic hose having an end to a structural member of an agricultural implement, The structural member has a port therethrough. The connector includes a tubular grommet positionable through the port of the structural member and having a first end, a second end receivable within the structural member, an inner surface defining a passage for receiving the end of the pneumatic hose therein and an outer surface. A flange extends radially from the outer surface from the tubular grommet and is engageable with a first side of the structural member. A locking barb extends from the outer surface from the tubular grommet adjacent the second end thereof. The locking barb is engageable with a second side of the structural member.

The flange includes a sealing surface. The sealing surface is engageable with the first side of the structural member and provides an air tight seal about the port The locking barb includes a projection surface extending from the second end of the tubular grommet and diverging from the inner surface of the tubular grommet. The projection surface includes a terminal end spaced from the second end of the tubular grommet. The terminal end of the projection surface is interconnected to the tubular grommet by a ledge. The flange is resilient so as to urge the ledge toward the second side of the structural member with the tubular grommet extending through the port in the structural member. It is contemplated for the locking barb to be a first locking barb of a plurality of locking barbs circumferentially spaced about the tubular grommet adjacent the second end thereof.

In accordance with a still further aspect of the present invention, a hose coupling assembly connectable to a housing having an interior and a port therethrough is provided. The assembly includes a hose having an interior configured for passage of air and including a terminal end. A fitting may be connected to the terminal end of the hose. A grommet has a first end coupled to the fitting, a second end receivable within the interior of the housing, an inner surface defining a passage communicating with the interior of the hose and the interior of the housing, and an outer surface. Alternatively, the hose may be shaped or threaded so that the hose connects directly onto the first end of the grommet. omitting the fitting. A flange extends radially from the outer surface of the grommet. The flange is engageable with a first side of the housing. A locking barb extends from the outer surface of the grommet adjacent the second end thereof The locking barb is receivable in the interior of the housing and is engageable with a second side of the housing.

The flange includes a sealing surface. The sealing surface is engageable with the first side of the housing and provides an air tight seal about the port. The locking barb includes a projection surface extending from the second end of the grommet and diverging from the inner surface of the grommet. The projection surface has a terminal end spaced from the second end of the grommet which is interconnected to the grommet by a ledge. The flange is resilient so as to urge the ledge toward the second side of the housing with the second end of the grommet received within the interior of the housing. The locking barb may be a first locking barb of a plurality of locking barbs circumferentially spaced about the grommet adjacent the second end thereof The fitting includes threads adapted to form a mating relationship with threads along the inner surface of the grommet.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 is an isometric view of an exemplary section of the hollow support frame of FIG. 1 illustrating a connector in accordance with the present invention;

FIG. 5 is a cross-sectional view showing the connector of the present invention received in a port of the hollow support frame of FIG. 4;

DETAILED DESCRIPTION OF THE DRAWINGS

Figure 1:
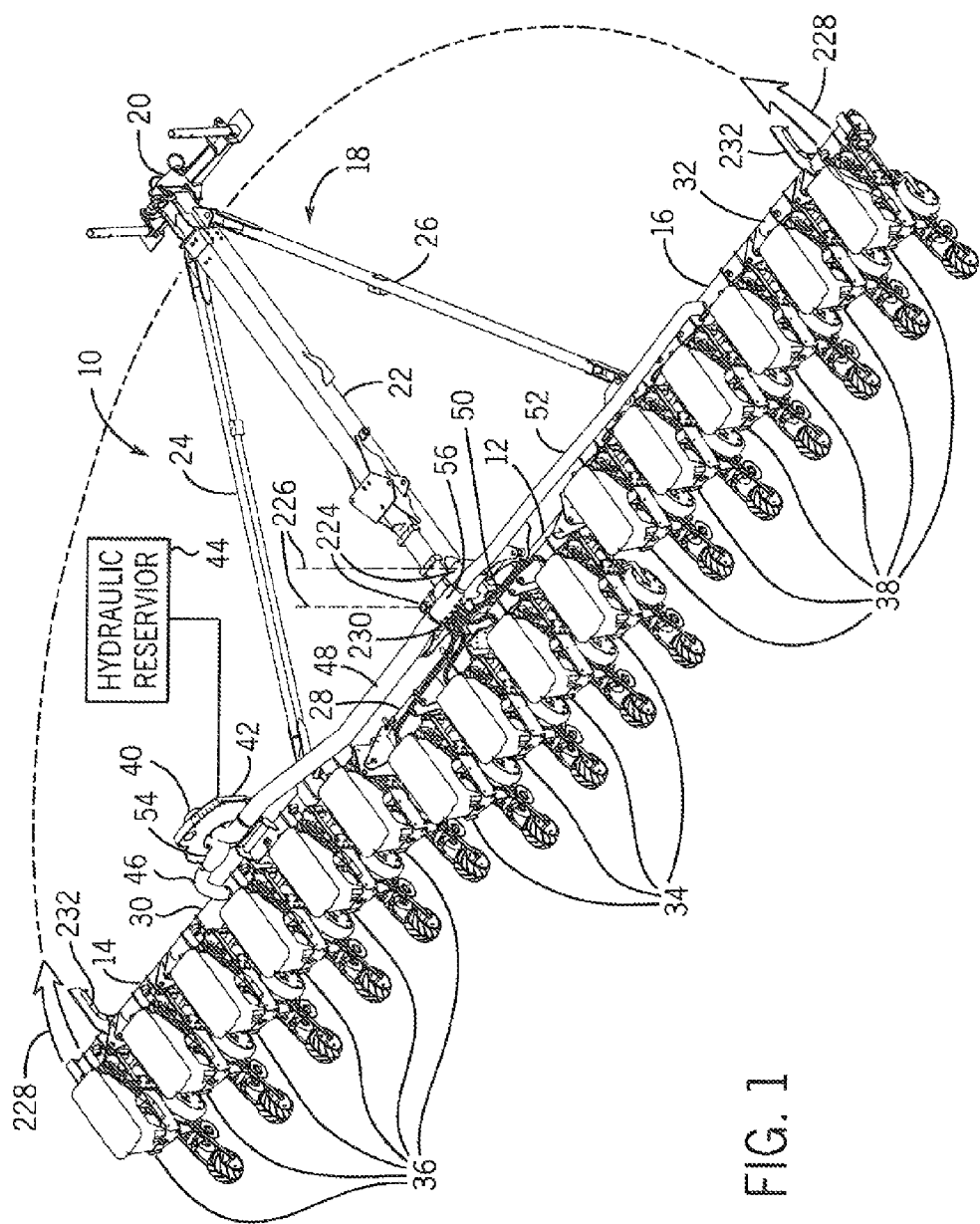
FIG. 1 is an isometric view of an exemplary agricultural seed planter, illustrating a multiple section hollow support frame including a plurality of individual row units and a tow frame coupled thereto.

Referring now to the drawings, and more particularly to FIG. 1, as known in the art, there is shown an agricultural seed planter or precision planter 10 that includes a hollow support frame having a middle section 12, a left section 14, and a right section 16. Each section is coupled to a tow frame 18 having connection point 20 that may be coupled to a tractor or other vehicle to facilitate the seeding operation. The illustrated tow frame 18 includes a center beam 22, a left section support beam 24, and a right section support beam 26 extending between the point 20 and the sections 12, 14, and 16, respectively.

The middle section 12 left section 14, and right section 16 may include a plurality of hollow structural members that support a plurality of row units. For example, middle section 12 may include hollow structural member 28, left section 14 may include hollow structural member 30, and right section 16 may include hollow structural member 32. The hollow structural members 28, 30, 32 may include more than one hollow metal beam mechanically coupled together to form the section. Furthermore, each hollow metal beam may have a generally rectangular cross section and include a separate hollow interior as will be discussed in more detail below. Additionally, the hollow structural members 28, 30. 32 may be made out of any suitable structural material and is not limited to metal or structural steel. For example, the structural material may be made from a composite material or durable plastic. However, one of the embodiments includes structural steel for the material of the hollow structural members 28, 30, 32. Again, these hollow structural members 28, 30, 32 are specifically designed to be load bearing members.

Middle section 12 may include a plurality of individual row units 34, which may also be referred to as row units, planters, seed planters, or seeding assemblies. Similarly, left section 14 may include a plurality of individual row units 36, and right section 16 may include a plurality of individual planting units 38. Specifically, the agricultural seed planter 10 illustrated in FIG. 1 is a sixteen row assembly and includes sixteen planting units 34, 36, 38. Middle section 12 is shown having four individual row units 34, left section 12 is shown having six individual row units 26, and right section 14 is shown having six individual row units 38. Other embodiments of the present invention may include a different total number of planter units (e.g., 1, 2, 4, 8, 12, 16, 20, 24, etc.) and one such embodiment that includes twenty-four row units will be discussed in more detail below.

Additionally, left section 14 and right section 16 are coupled to middle section 12 via a pivot (e.g., a hinge or pin-type) connection which enables the entire frame to flex and follow the terrain more evenly. This enables for precision depth control of the seeding operation for each row unit 34, 36, 38 via the relative motion of one section to the adjacent section. The pivot connection will be discussed in more detail below.

A motor 40 and a fan or blower 42 may be mounted to any of the structural members 28, 30, 32. In the illustrated embodiment, the motor 40 and fan 42 are positioned on structural member 30 of the left section 14. Motor 40 may be a hydraulic motor coupled to a hydraulic reservoir 44 and used to drive the fan 42. Other embodiments of motor 40 include an electric motor, a combustion engine, and so forth. Moreover, embodiments of the fan 42 may include an axial fan, a blower-type fan, a plurality of parallel fans, a plurality of sequential fans, a turbine-type fan, or a combination thereof.

As known in the art, a conduit system or flexible tubing system may be used to pneumatically couple the fan 42 to the hollow structural members 28, 30, and 32. For example, in the present embodiment, conduit 46 is used to couple the fan 42 to the hollow structural member 30 of the left section 14. Conduit 48 is used to couple the fan 42 to the middle section 12 and right section 16. Specifically, conduit 48 connects to junction 56, attached to the middle section 12, to enable conduit 50 to pneumatically couple row units 34 to the fan 42. Further, conduit 52 connects to junction 56 to pneumatically couple the hollow structural member 32 of the right section to the fan 42. Additionally, multi-way coupling or tee 54 is mounted to the fan 42 to couple conduits 46 and 48 to the fan. hi other embodiments, tee 54 may be completely eliminated from the assembly 10, and a single conduit may extend between the fan 42 and members 28, 30, and 32.

As will be discussed in more detail below, pneumatically coupling the fan to the hollow structural members 28, 30, and 32 enables the fan to pass a forced airflow through each hollow structural member 28, 30, and 32. Further, this forced air flow may create either a pressure increase or a pressure drop (e.g., a vacuum) in the structural members 28, 30, 32 and the conduits 46, 48, 50, 52 depending on the direction of the forced air flow created by the fan 42. Embodiments of the present invention may be configured for either a pressure increase or a pressure drop in the structural member. However, one of the embodiments is configured so that the fan creates a vacuum inside structural members 28, 30, 32 and conduits 46, 48, 50, 52. Again, the members 28, 30, and 32 are configured to function as load bearing and/or structural support members and also function as an integral manifold. In other words, in the illustrated embodiment, all of the conduits between the fan 42 and the individual row units 34, 36, and 38 couple to the members 28. 30, and 32, which then route the airflow between the individual row units 34, 36, and 38 and the members 28, 30, 32. Although some embodiments may include supplemental manifolds or multi-way couplings, the members 28, 30, and 32 serve as the primary manifold for the assembly 10.

Figure 2:
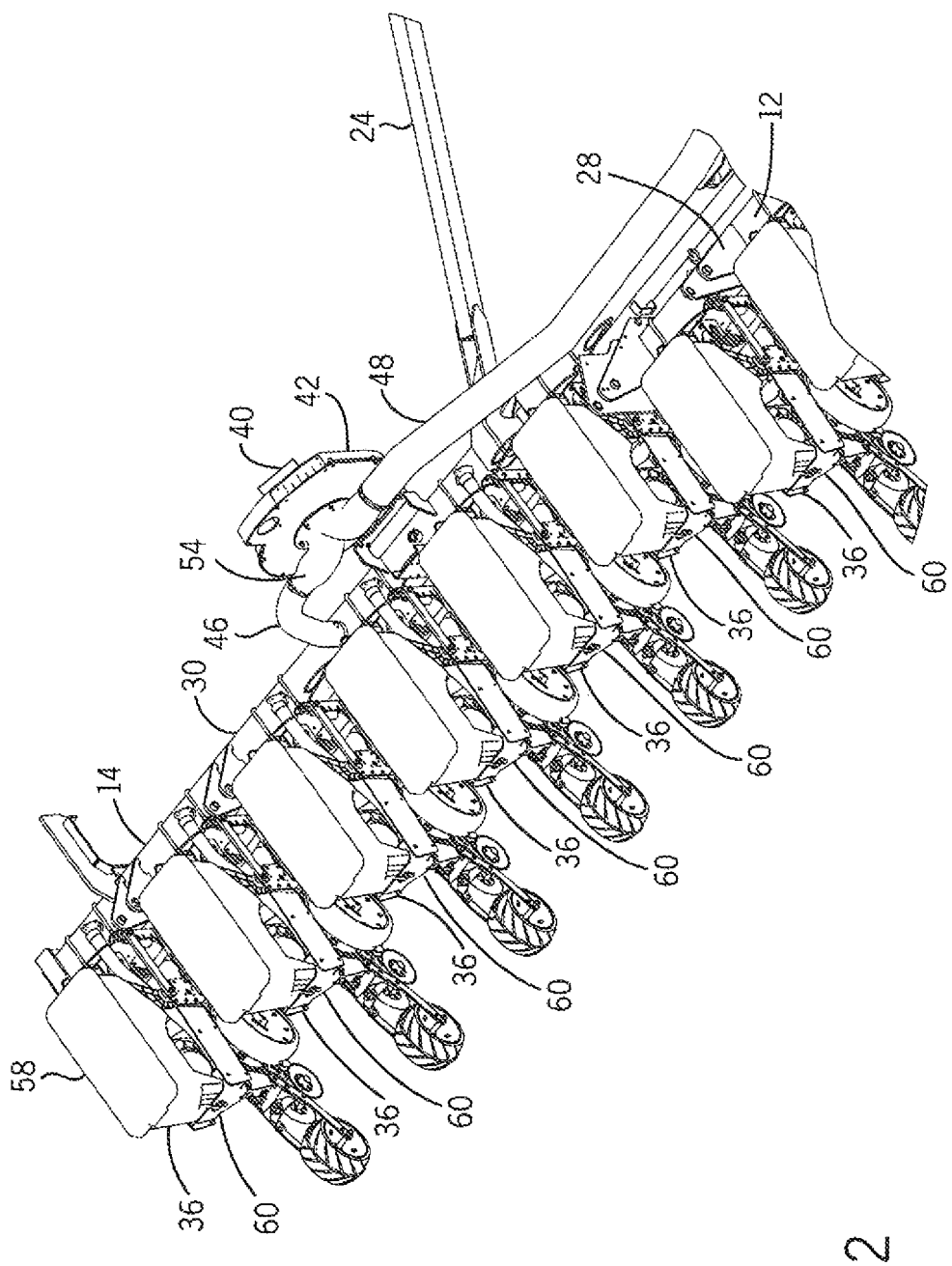
FIG. 2 is an isometric view of an embodiment of the upper left section of the agricultural seed planter of FIG. 1, illustrating a fan and multiple seed hoppers for each row unit coupled to the hollow support frame.

Referring now to FIG. 2, as known in the art, a perspective view of an embodiment of the upper left section 14 of the agricultural seed planter 10 of FIG. 1 is shown. As discussed above, fan 42 is coupled to structural member 30 of the left section 14 via conduit 46 and tee 54. Additionally, conduit 48 couples the middle section 12 and right section 16 (not shown) to the fan via tee 54. FIG. 2 further illustrates individual row units 36 located on left section 14, as well as, one of the individual row units 34 located on the middle section 12. Each of the row units or row units 34, 38 include a seed hopper 58 (including bulk fill hoppers or tanks) used to store and supply the seed for the seeding operation. Further, row units 34, 38 are mounted to structural members 28 and 30 via a planter frame 60.

Figure 3:
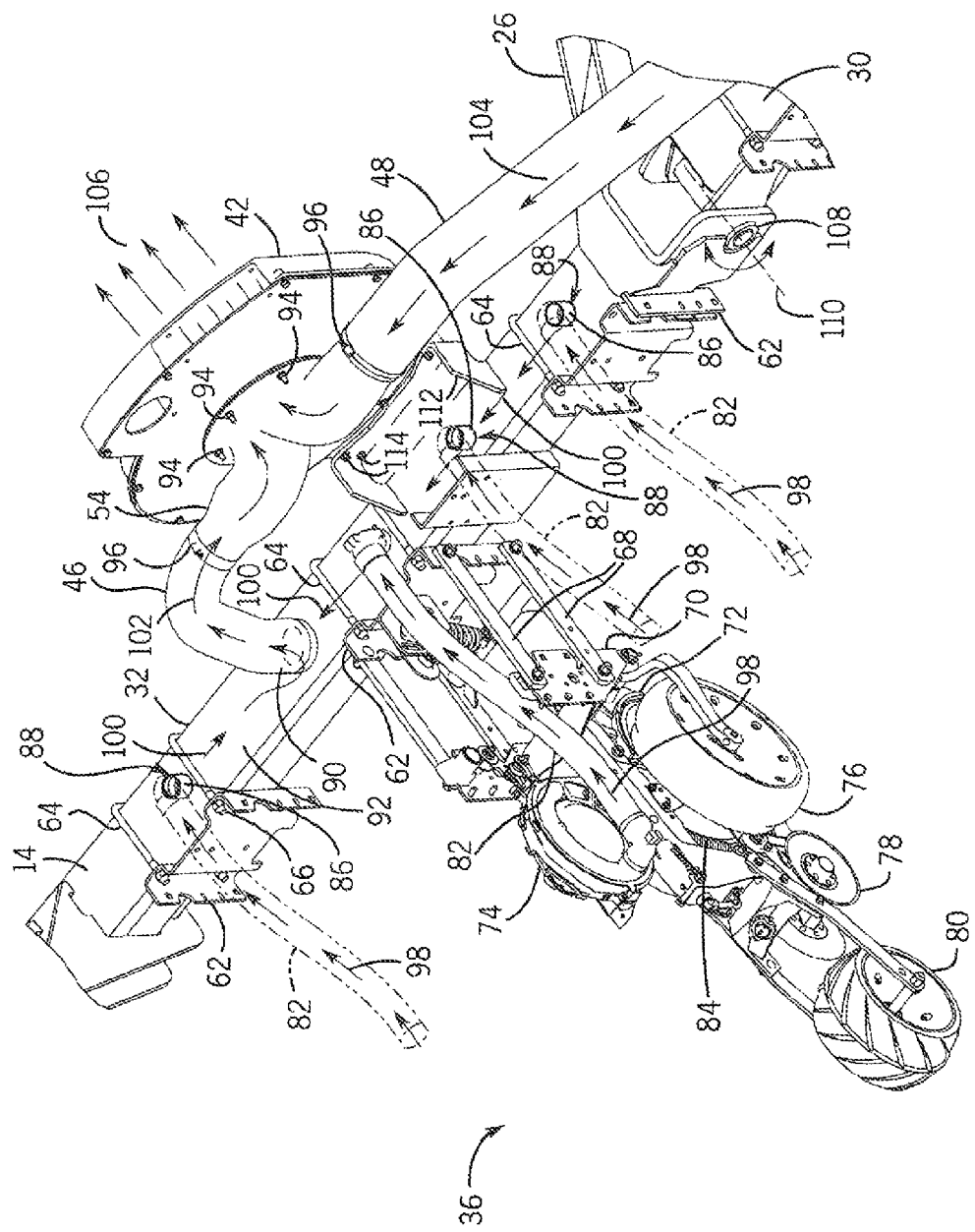
FIG. 3 is an isometric view of an embodiment of a single row unit mounted to the hollow support frame of FIG. 2 with the seed hopper removed for clarity, further illustrating an exemplary air flow path from a row unit to a fan.

Referring now to FIG. 3, a perspective view of an embodiment of a single row unit 36 mounted to the hollow structural member 30 of the left section 14 is shown. The seed hopper 58 and planter frame 60 are removed for clarity. FIG. 3 illustrates the pneumatic coupling between the row unit 36 and fan 42. Additionally, FIG. 3 illustrates one method for mounting row unit 36 to structural member 30. A mounting bracket 62 may be used in conjunction with U-bolts 64 and nuts 66 to provide an interface between the structural member 30 and row unit 36. Alternatively, mounting bracket 62 may be welded to structural member 30 and/or row unit 36 to provide a connection therebetween. Specifically, mourning bracket 62 provides mounting structures for parallel linkage 68 and support frame 70 of the row unit 36. The mounting bracket 62 further enables the hollow structural member 30 to bear and/or distribute static and dynamic loads of the row unit 36 and agricultural seed planter 10. Additionally, parallel linkage 68 and support frame 70 enable vertical motion of the seeding assembly in addition to any relative motion between left section 14 and middle section 12 as discussed in more detail below.

Row unit 36 generally includes, but is not limited to, a soil opener 72, a seed meter 74, a depth wheel 76, a closing wheel or soil closer 78, and a press wheel or soil packer 80. Additionally, seed meter 74 may include either a negative pressure (e.g., vacuum) or positive pressure meter and may be coupled to a seed tube 84. Row unit 36 may also include a number of other parts not shown, such as coulter, shanks, tillage, blades, etc.

Seed meter 74 is pneumatically coupled to vacuum fan 42 via an airflow circuit that includes the hollow structural members 28, 30, 32. Specifically, in the illustrated embodiment, seed meter 74 is coupled to hollow structural member 30 via a first conduit, flexible hose, or tube 82 and grommet 86. Grommet 86 is made from resilient material and is connected directly to the hose 82 and structural member 30. Additionally, hollow structural member 30 may include a plurality of first ports 88 and a second port 90 to provide an air flow path through the structural member 30. Ports 88 and 90 are generally openings incorporated into the hollow structural member 30 via known manufacturing processes. It is understood that some of ports 88 and 90 may incorporate different manufacturing processes to facilitate coupling the conduits to the ports 88 and 90 of the structural member 30. for example, an upset may be machined and welded on the structural member 30. It is also understood that some or all of ports 88 and 90 may use grommet 86 to facilitate coupling, as further described below, and that grommet 86 may be used with any manufacturing of port 88 and 90.

A plurality of ports 88 may be located along the length of each hollow structural member 28, 30, 32 at the desired planter location. FIG. 3 illustrates four ports 88 located on the length of the left section 14. Additionally, FIG. 3 illustrates a single port 90 for coupling conduit 46 to the hollow structural member 32 of the left section 14. As illustrated, ports 88 may be located at opposite ends of the structural member 30 and in varying proximity from port 90. Again, these ports 88 and 90 and the hollow interior of the members 28, 30, and 32 enable the members to function as a manifold in addition to their function as load bearing and/or support members.

As discussed, each row unit 36 includes conduit 82 to pneumatically couple the seed meter 74 to the hollow structural member 30. Further, vacuum fan 42 is pneumatically coupled to the hollow structural member 30 via conduit 46. Conduit 46 may be secured to the hollow structural member 30 via grommet 86, as further described below, and may be secured to tee 54 via hose clamp 96. Additionally, tee 54 may be secured to the fan via screws 94. In sum. each planter 36 is pneumatically coupled to fan 42 via structural member 30. Specifically, the fan 42 provides a forced airflow through the path illustrated in FIG. 3. The figure illustrates a vacuum configuration, however, the air flow path could be circulated in the opposite direction for use with a positive pressure seed meter 74.

FIG. 3 illustrates the air flow path or circuit for an exemplary section of the agricultural seed planter 10, with the other sections operating in a similar manner. Upon enabling vacuum fan 42, a pressure differential is generated within the hollow interior or passage 92 of the structural member 30 thereby creating an air flow path or circuit between the seed meter 74 and vacuum fan 42. Specifically, the first portion of the air flow path is from seed meter 74 to the structural hollow member 30, generally represented by reference numeral 98. The second portion of the air flow path is through hollow interior 92 of the structural member 30 to conduit 46, generally represented by reference numeral 100. As illustrated in FIG. 3, this portion of the flow path is a combination of multiple flow paths from each planter assemblies 36 which provides the advantage of simplifying parts of the pneumatic system.

The third portion of the air flow path is from the structural member 30 through port 90 and to the fan 42 via conduit 46, generally represented by reference numeral 102. Similarly, conduit 48 provides the air flow path 104 from hollow structural. member 28 and 32 and combines with the left section air flow path at tee 54. Vacuum fan 42 then expels the air from the pneumatic circuit, generally represented by reference numeral 106. The illustrated embodiment provides a number of advantages in that parts pneumatically coupling the vacuum fan 42 to seed meter 74 are reduced via the combined functionality of the structural members 28, 30, 32 serving both as structural supports for the individual row units 34, 36. 38 and the fan 42, as well as, a common air flow circuit for each row unit. Thus, the complexity of the pneumatic system is reduced and extra room is available to route other system components on the outside of the structural member, such as electrical harnesses, hydraulic hoses, etc.

Finally, FIG. 3 illustrates an embodiment of the present invention which includes a pm that enables relative motion between the multiple sections of the agricultural seed planter 10. Specifically, a pin connection or wing flex pm 108 couples two portions of the left section 14 together and enables the section to move relative to one another about axis 110. As discussed above, this enables each individual section to follow the terrain thereby enabling individual row units 34, 36, 38 to maintain a constant seeding depth regardless of the irregularity of the terrain. Additionally. FIG. 3 illustrates the fan mounting bracket 112 and fasteners 114 used to secure fan 42 to the hollow structural member 30.

Referring to FIG. 4, a perspective view of an embodiment of an exemplary section of the hollow structural members 28, 30, 32 and an exemplary port 88 of the previous figures is shown. FIG. 4 illustrates the grommet 86 to facilitate the coupling of the tube 82 to port 88 in the hollow structural member 30. Port 88 is shown as an opening incorporated into the hollow structural member 30 using known manufacturing methods. It is also contemplated for grommet 86 to be used to couple conduit 46 to port 90, with the dimensions of grommet 86 being adapted to correspond to the dimensions of port 90. FIG. 3. Further, it can be appreciated that grommet 86 may be used to couple any conduit or tube to a corresponding port or opening in hollow structural member 30 or other structural member of an agricultural seed planter 10.

Referring to FIGS. 4-7, grommet 86 extends along a longitudinal axis and includes a first insertion end 142 adapted to be received within the port 88 and to extend into the hollow structural member 30 when coupled thereto. Grommet 86 further includes a second end 144 adapted for receiving threads 138 of fitting 140 connected to terminal end 135 of tube 82, as hereinafter described. It is contemplated that the fitting 140 may alternatively include longitudinal splines, instead of threads 138, which mate with corresponding grooves of the grommet 86. Also, the fitting 140 may be omitted and the tube 82 may couple directly with grommet 86. It is contemplated for grommet 86 to be constructed of a resilient material, such as rubber or plastic, and is generally non-metallic to facilitate a sealing arrangement between grommet 86 and structural member 30, hereinafter described.

Grommet 86 is defined by tubular head 132 having inner and outer surfaces 137 and 139, respectively. Tubular head 132 includes a generally circular upper edge 132*a* and a generally circular lower edge 132*b*. Threads 136 extend along inner surface 137 of tubular head 132 between upper edge 132*a* and lower edge 132*b* thereof Lower edge 132*b* of tubular head 132 is interconnected to tubular neck 124 by shoulder 141. For reasons hereinafter described, shoulder 141 has a length generally equal to the thickness (t) of fitting 140.

Figure 7:
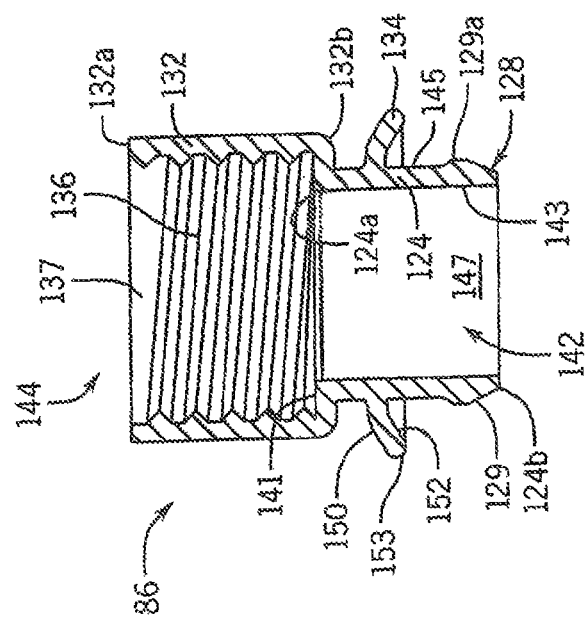
FIG. 7 is a cross-sectional view of the connector of the present invention taken along line 7-7 in FIGS. 6.

As best seen in FIG. 7, tubular head 132 and tubular neck 124 are constructed as a single, unitary piece. However, it is contemplated to construct tubular head 132 and tubular neck 124 as separate pieces that are joined together without deviating from the scope of the present invention. Tubular neck 124 extends along the longitudinal axis of tubular head 132 and is concentric therewith. Tubular neck 124 is defined by inner and outer surfaces 143 and 145, respectively, a generally circular upper edge 124*a* and a generally circular lower edge 124*b*. It is intended for tubular neck 124 to have an outer diameter generally equal to or slightly greater than the diameter of the port 88, for reason hereinafter described. Inner surface 143 of tubular neck 124 and inner surface 137 of tubular head 132 define a passage 147 through grommet 86, for reasons hereinafter described.

Flange 134 extends circumferentially about and projects outwardly from outer surface 145 of tubular neck 124 at a location spaced for upper edge 124a and lower edge 124b. Flange 134 is generally dome-shaped and includes a downwardly curved outer surface 150 directed toward insertion end 142 of grommet 86 and a downwardly curved inner surface 152 also directed toward insertion end 142 of grommet 86. Terminal edge 153 of flange 154 is radially spaced from and extends circumferentially about outer surface 145 of tubular neck 124. It is intended for terminal edge 153 of flange 154 to form a sealable interface with upper or outer surface 146 of structural member 30, FIG. 5, as hereinafter described. While flange 134 is described as having a dome-shaped configuration, it is contemplated for flange 134 to be generally ring-shaped and to be defined by two generally flat, spaced surfaces wherein in the lower surface of the flange 134 forms a sealable interface with upper surface 146 of structural member 30.

Tubular neck 124 further includes a plurality of circumferentially spaced locking barbs 128 projecting from outer surface 145 adjacent lower edge 124a thereof Each barb 128 includes a projection surface 129 extending from lower edge 124a of tubular neck 124 and terminating at terminal edge 129a which is spaced from outer surface 145 of tubular neck 124 by ledge 131 such that projection surface 129 diverges from inner surface 143 of tubular neck 124. it is intended for ledges 131 of barbs 128 to be spaced from inner surface 152 of flange 134 by a distance approximating the thickness of structural member 30. In the depicted embodiment, four locking barbs 128 are circumferentially spaced about tubular neck 124. It is contemplated for tubular neck 24 to include any number of barbs 128 (e.g., 2, 3, 5 6, etc.) without deviating from the scope of the present invention. Alternatively, it is contemplated for barb 128 to take the form of a singular ring extending about the entire periphery of tubular neck 124.

Figure 6:
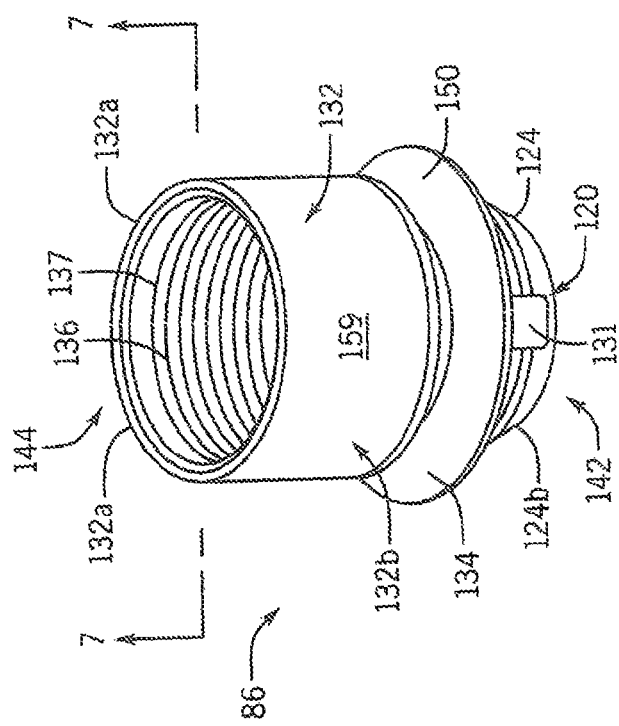
FIG. 6 is an isometric view of the connector of the present invention.

Referring to FIGS. 4 and 5, in operation. threads 136 along inner surface 137 of tubular head 132 of grommet 86, FIG. 6, are aligned with corresponding threads 138 on fitting 140. Tubular head 132 of grommet 86 is threaded onto threads 138 of fitting 140 in a conventional matter. Shoulder 141 within the interior of grommet 86 acts as a stop to limit the distance on which tubular head 132 of grommet 86 may be threaded onto threads 138 of fitting 140. As best seen in FIG, 7, it is contemplated for the inner diameter of fitting 140 to be substantially similar to the inner diameter of the tubular neck 124 of grommet 86 such that the passageway through grommet 86 has a constant diameter, for reasons hereinafter described.

Referring to FIG, 8, once grommet 86 is interconnected to fitting 140, insertion end 142 of grommet 86 is inserted into port 88 of the hollow structural member 30 such that barbs 128 pass therethrough and structural member 30 is positioned between flange 154 and ledges 31 of barbs 28. It is understood that the angled configurations of projection surfaces 129 of barbs 128 facilitate the insertion of insertion end 142 of grommet 86 into port 88. Once insertion end 142 of grommet 86 is inserted into port 88 of the hollow structural member 30 as heretofore described, the resiliency of flange 154 urges ledges 131 of barbs 128 against the inner surface 148 of the hollow structural member 30 and terminal edge 153 of flange 154 against outer surface 146 of structural member 30 such that terminal edge 153 of flange 154 to forms a sealable interface with outer surface 146 of structural member 30. In addition, with structural member 30 captured between terminal edge 153 of flange 154 and ledges 31 of barbs 28, movement of grommet 86 in port 88 is limited. It can be appreciated that barbs 128 maintain grommet 86 in port 88 and discourage the removal of grommet 86 therefrom.

Figure 8:
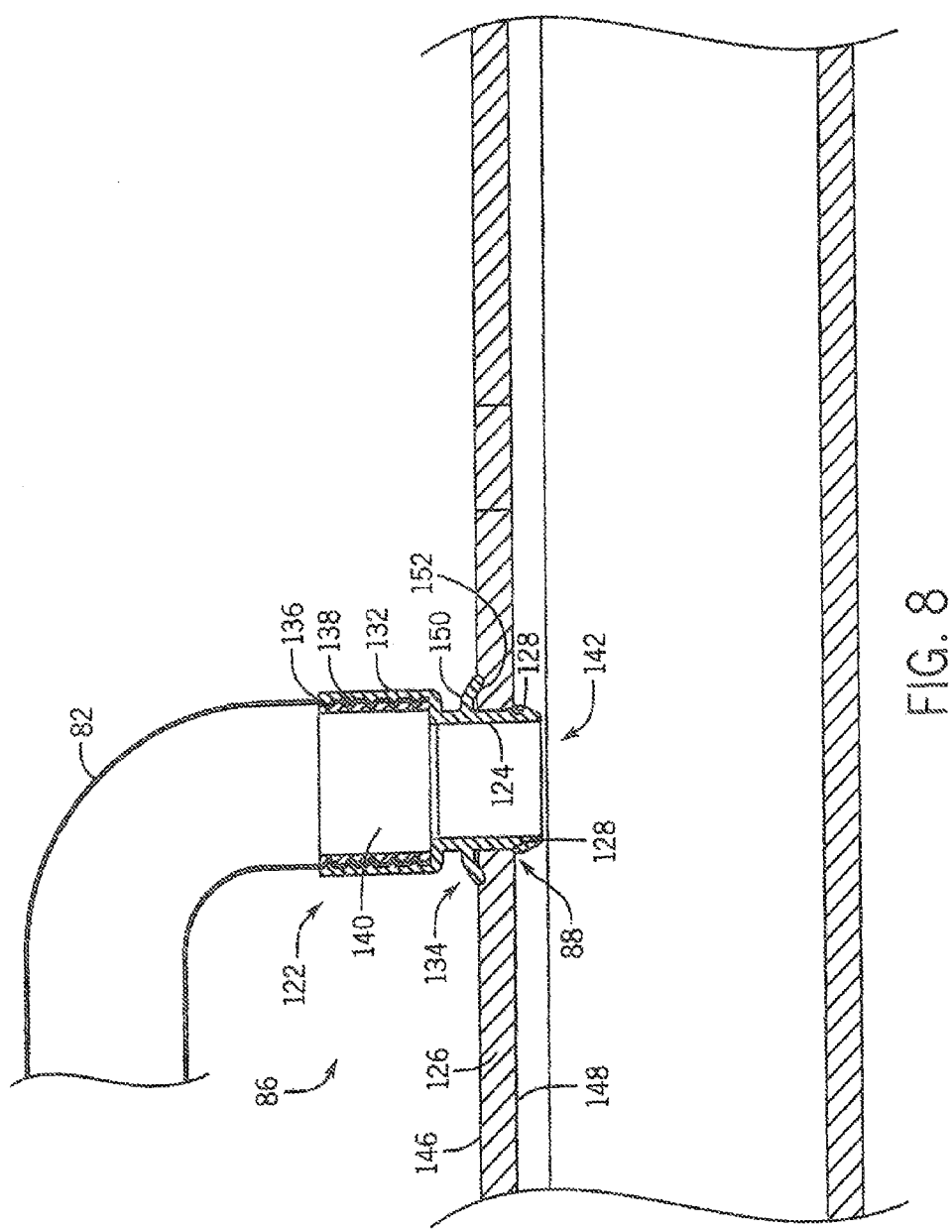
FIG. 8 is a cross-sectional view, similar to FIG. 5, showing a fitting of a pneumatic hose connected to the connector of the present invention.

Once tube 82 is coupled to hollow structural member 30 via grommet 86, FIG. 8, pressurized air produced by the fan 42 flows from tube 82, through grommet 86, and into hollow structural member 30. Terminal end 153 of flange 134 acts as a seal to prevent the pressurized air flowing into structural member 30 through grommet 86 from exiting structural member 30 through port 88. In addition, terminal end 153 of flange 134 also acts to prevent dirt and debris from entering structural member 30 through port 88. It can be appreciated that the uniform diameter of the passageway though grommet 86 when mounted on fitting 140 insures that the air flowing from tube 82 into structural member 30 will flow through grommet 86 unimpeded or redirected by sidewalls or the like.

In order to remove grommet 86 removed from port 88 of hollow structural member frame 30 for maintenance or the like, it is necessary for ledges 131 of barbs 128 to pass through port 88. As such, it is contemplated to provide sufficient force on grommet 86 to compress tubular neck 124 such that ledges 131, and hence, barbs 128 may pass through port 88.

It can be appreciated that the durometer and wall thickness of the elements of grommet 86, including tubular head 132, tubular neck 124 and flange 134, may be adjusted to optimize the functional properties of grommet 86. For example, the durometer and thickness of tubular head 132 and tubular neck 124 may be adjusted to increase the strength and durability of flange 134 to facilitate the seal around the port 88 and the connection with tube 82. It can be further appreciated that flange 134 may also be constructed of a resilient material that may be the same or different from the material from which tubular head 132 and tubular neck 124 are constructed. For example, the flange 134 may be constructed of rubber, plastic, silicone, metal, cork, felt, sponge, foam and other non-rigid material which is better able to provide an air-tight seal of port 88.

It can be appreciated that in addition to interconnecting tube 82 to structural member 30 as depicted in FIGS, 4 and 5, grommet 86 may be used to facilitate attachment of conduit 46 at a desired location, without deviating from the scope of the present invention. It is also contemplated that the above arrangement may apply to a grommet 86 installed in any port or opening of a structural member for an agricultural seed planter, or otherwise.

Many changes and modifications could be made to the invention without departing from the spirit thereof The scope of these changes will become apparent from the appended claims.

We claim:

1. A connector for connecting a tubular structure to a structural member having first and second generally flat opposite sides and a port therebetween, the tubular structure including a terminal end, comprising;
    a tubular head defining a passage extending along an axis, the tubular head connectable to the terminal end of the tubular structure;
    a tubular neck depending from the tubular head and having a passage in communication with the passage of the tubular head and extending along the axis, the tubular neck:

having an inner surface, an outer surface and a terminal end inicuding a generally circular, planar edge defining an opening in communication with the passage in the tubular neck; and including a first portion configured to pass through the port and into the structural member;

a resilient flange extending from a second portion of the tubular neck, the flange having a generally arcuate configuration and a terminal edge engageable with a first side of the structural member; and a locking barb projecting from the outer surface along the first portion of the tubular neck at a location between the edge and the resilient flange and being engageable with the second side of the structural member, the locking barb discouraging removal of the first portion of the tubular neck from the structural member through the port;

wherein the resiliency of the flange urges the locking barb against the second side of the structural member and urges the terminal edge of the flange against the first side of the structural member with the first portion of the tubular neck received in the structural member to form a sealable interface between the tubular structure and the structural member;

wherein the locking barb includes a projection surface extending from the terminal end of the tubular neck and diverging from the inner surface of the tubular neck.

2. The connector of claim 1 wherein the flange extends radially from the second portion of the tubular neck.

3. The connector of claim 1 wherein the terminal edge of the flange defines a sealing surface, the sealing surface engageable with the first side of the structural member and provides an air tight seal about the port.

4. The connector of claim 1 wherein the projection surface includes a terminal end spaced from the terminal end of the tubular neck, the terminal end of the projection surface interconnected to the tubular neck by a ledge.

5. The connector of claim 1 wherein the locking barb is a first locking barb and wherein the first locking barb is one of a plurality of locking barbs circumferentially spaced about the first portion of the tubular neck.

6. The connector of claim 1 wherein the passage through the tubular head has a diameter greater than a diameter of the passage though the tubular neck.

7. The connector of claim 1 wherein the passage through the tubular head is defined by an inner surface, the inner surface of the tubular neck is threaded and adapted to receive corresponding threads on the tubular structure in a mating relationship.

8. The connector of claim 1 wherein the tubular neck has an outer diameter, the outer diameter of the tubular neck being at least equal to a diameter of the port.

9. A connector for connecting a pneumatic hose having an end to a structural member of an agricultural implement, the structural member having first and second generally flat sides and a port therethrough, the connector comprising:

a tubular grommet positionable through the port of the structural member and having a first end, a second end receivable within the structural member and terminating at a generally circular, planar edge, an inner surface defining a passage for receiving the end of the pneumatic hose therein and an outer surface;

a resilient flange extending radially from the outer surface of the tubular grommet, the flange having a generally arcuate configuration and a terminal edge engageable with the first side of the structural member: and a locking barb extending from the outer surface of the tubular grommet at a location between the edge and the resilient flange, the locking barb engageable with the second side of the structural member;

wherein:

the locking barb includes a projection surface extending from the second end of the tubular grommet and diverging from the inner surface of the tubular grommet; and the resiliency of the flange urges the locking barb against the second side of the structural member and urges the terminal edge of the flange against the first side of the structural member with the second end of the tubular grommet received in the structural member to form a sealable interface between the tubular grommet and the structural member.

10. The connector of claim 9 wherein the terminal edge of the flange defines a sealing surface, the sealing surface engageable with the first side of the structural member and providing an air tight seal about the port.

11. The connector of claim 9 wherein the projection surface includes a terminal end spaced from the second end of the tubular grommet, the terminal end of the projection surface interconnected to the tubular grommet by a ledge.

12. The connector of claim 9 wherein the locking barb is a first locking barb and wherein the first locking barb is one of a plurality of locking barbs circumferentially spaced about the tubular grommet adjacent the second end thereof.

13. A hose coupling assembly connectable to a housing having first and second sides, an interior and a port therethrough, comprising:

a hose having an interior configured for passage of air, the hose including a terminal end;

a fitting connected to the terminal end of the hose;

a grommet having a first end coupled to the fitting, a second end receivable within the interior of the housing and defining a generally circular, planar edge, an inner surface defining a passage communicating with the interior of the hose and the interior of the housing, and an outer surface;

a resilient flange extending radially from the outer surface of the grommet, the flange having a generally arcuate configuration and a terminal edge engageable with the first side of the housing; and a locking barb extending from the outer surface of the grommet at a location between the edge and the resilient flange, the locking barb receivable in the interior of the housing and engageable with the second side of the housing;

wherein the resiliency of the flange urges the locking barb against the second side of the housing and urges the terminal edge of the flange against the first side of the housing with the second end of the grommet received in the housing to form a sealable interface between the grommet and the housing;

wherein:

the locking barb includes a projection surface extending from the second end of the grommet and diverging from the inner surface of the grommet, the projection surface includes a terminal end spaced from the second end of the grommet and which is interconnect to the grommet by a ledge; and the flange urges the ledge toward the second side of the housing with the second end of the grommet received within the interior of the housing.

14. The assembly of claim 13 wherein the terminal edge of the flange defines a sealing surface, the sealing surface engageable with the first side of the housing and providing an air tight seal about the port.

15. The assembly of claim 13 wherein the locking barb is a first locking barb and wherein the first locking barb is one of a plurality of locking barbs circumferentially spaced about the grommet adjacent the second end thereof.

16. The assembly of claim 13 wherein the fitting includes threads adapted to form a mating relationship with threads along the inner surface of the grommet.

\* \* \* \* \*